US010579833B1

(12) United States Patent
Cook et al.

(10) Patent No.: US 10,579,833 B1
(45) Date of Patent: Mar. 3, 2020

(54) TAMPER DETECTION CIRCUIT ASSEMBLIES AND RELATED MANUFACTURING PROCESSES

(71) Applicant: Thales eSecurity, Inc., Plantation, FL (US)

(72) Inventors: Timothy E. Cook, Coral Springs, FL (US); Gerald Thomas Wardrop, Jr., Coral Springs, FL (US)

(73) Assignee: THALES ESECURITY, INC., Plantation, FL (US)

( * ) Notice: Subject to any disclaimer, the term of this patent is extended or adjusted under 35 U.S.C. 154(b) by 373 days.

(21) Appl. No.: 14/964,048

(22) Filed: Dec. 9, 2015

Related U.S. Application Data

(60) Provisional application No. 62/092,644, filed on Dec. 16, 2014.

(51) Int. Cl.
*G06F 21/86* (2013.01)
*G06F 21/88* (2013.01)
*G06F 21/87* (2013.01)

(52) U.S. Cl.
CPC .............. *G06F 21/86* (2013.01); *G06F 21/87* (2013.01); *G06F 21/88* (2013.01)

(58) Field of Classification Search
CPC ................................................. G06F 21/86–88
USPC .......................................................... 726/34
See application file for complete search history.

(56) References Cited

U.S. PATENT DOCUMENTS

| | | | | |
|---|---|---|---|---|
| 5,269,378 A * | 12/1993 | Maas | ..................... | H02G 3/088 169/48 |
| 5,858,500 A | 1/1999 | MacPherson | | |
| 6,483,714 B1 * | 11/2002 | Kabumoto | ........ | H01L 23/49822 174/250 |
| 6,586,924 B1 * | 7/2003 | Okayasu | ............ | G01R 31/3191 324/532 |
| 6,646,565 B1 * | 11/2003 | Fu | ........................... | G06F 21/86 340/568.7 |
| 6,686,539 B2 | 2/2004 | Farquhar et al. | | |
| 6,853,093 B2 * | 2/2005 | Cohen | ................... | H01L 23/576 257/678 |
| 7,180,008 B2 | 2/2007 | Heitmann et al. | | |
| 7,570,201 B1 * | 8/2009 | Watkins | ................ | G01S 7/4008 342/100 |
| 7,760,086 B2 | 7/2010 | Hunter et al. | | |
| 7,787,256 B2 | 8/2010 | Chan et al. | | |
| 7,898,413 B2 * | 3/2011 | Hsu | ......................... | G06F 21/86 340/568.1 |
| 8,007,286 B1 * | 8/2011 | Holec | ..................... | H01R 4/02 439/65 |

(Continued)

*Primary Examiner* — Saleh Najjar
*Assistant Examiner* — Peiliang Pan
(74) *Attorney, Agent, or Firm* — Sage Patent Group; Marc Boillot

(57) ABSTRACT

A tamper sensor assembly includes a lid having a surface and a sensor substrate on the surface of the lid. The sensor substrate has conductive lines that extend across at least a major portion of the surface of the lid and conform to three dimensional characteristics of the surface of the lid. The security processor is electrically connected to the conductive lines of the sensor substrate and is configured to identify occurrence of tampering with the lid based on an electrical characteristic of signals conducted through the conductive lines, and to perform an anti-tampering operation responsive to identifying occurrence of tampering.

29 Claims, 14 Drawing Sheets

(56) References Cited

U.S. PATENT DOCUMENTS

| | | | |
|---|---|---|---|
| 8,589,703 B2 | 11/2013 | Lee | |
| 8,891,303 B1* | 11/2014 | Higgins | G11C 16/10 365/185.1 |
| 8,987,079 B2* | 3/2015 | Or-Bach | H01L 21/6835 438/198 |
| 9,071,446 B2 | 6/2015 | Kreft | |
| 9,203,546 B1 | 12/2015 | Wade | H04K 3/228 |
| 9,465,472 B1* | 10/2016 | Almanza-Workman | G06F 3/044 |
| 9,572,249 B2* | 2/2017 | Ray | H05K 1/0296 |
| 9,578,763 B1* | 2/2017 | Wade | H05K 5/0208 |
| 9,628,057 B2* | 4/2017 | Shuvalov | H03K 5/00006 |
| 9,821,475 B1* | 11/2017 | Lynn | B25J 18/06 |
| 2002/0002683 A1* | 1/2002 | Benson | G06F 21/86 713/194 |
| 2002/0176333 A1* | 11/2002 | Lin | G11B 7/0945 369/44.29 |
| 2002/0196889 A1* | 12/2002 | Tamura | G06F 1/04 375/373 |
| 2004/0061538 A1* | 4/2004 | Yasuda | G06F 7/588 327/164 |
| 2004/0120101 A1* | 6/2004 | Cohen | H01L 23/576 361/654 |
| 2004/0217822 A1* | 11/2004 | Andrews | H03C 3/06 331/78 |
| 2005/0055392 A1* | 3/2005 | Saito | G06F 7/588 708/251 |
| 2005/0094462 A1* | 5/2005 | Jakobs | G11C 7/1078 365/222 |
| 2005/0225445 A1* | 10/2005 | Petersen | B65D 5/42 340/568.2 |
| 2007/0069875 A1* | 3/2007 | Doi | G06F 21/554 340/440 |
| 2007/0080835 A1* | 4/2007 | Maeda | H03D 3/009 341/120 |
| 2008/0013299 A1 | 1/2008 | Renn | |
| 2008/0052904 A1* | 3/2008 | Schneider | H01L 21/486 29/846 |
| 2008/0071487 A1* | 3/2008 | Zeng | G01N 29/028 702/65 |
| 2008/0220430 A1* | 9/2008 | Ptacek | C12Q 1/6883 435/6.16 |
| 2008/0284610 A1 | 11/2008 | Hunter | |
| 2009/0167457 A1* | 7/2009 | Melde | H01P 5/04 333/32 |
| 2009/0283699 A1* | 11/2009 | Baltz | G01N 21/6408 250/459.1 |
| 2010/0318306 A1* | 12/2010 | Tierney | G01D 4/002 702/62 |
| 2011/0018657 A1* | 1/2011 | Cheng | H01P 3/121 333/239 |
| 2011/0226511 A1* | 9/2011 | Matsushita | C09D 11/101 174/250 |
| 2013/0015972 A1* | 1/2013 | Sasson | G06F 21/86 340/540 |
| 2013/0119337 A1* | 5/2013 | Kang | H01L 27/2409 257/2 |
| 2013/0326089 A1* | 12/2013 | Harrison | H04M 1/24 710/5 |
| 2014/0097986 A1* | 4/2014 | Xue | H01Q 3/34 342/372 |
| 2014/0268591 A1* | 9/2014 | Ray | H05K 1/0296 361/748 |
| 2014/0268852 A1* | 9/2014 | Foley | B60Q 1/0058 362/520 |
| 2014/0314235 A1* | 10/2014 | Matischek | H04N 1/4486 380/243 |
| 2015/0088448 A1* | 3/2015 | Du | G01S 17/36 702/97 |
| 2015/0149392 A1* | 5/2015 | Bolich | G06Q 10/20 706/11 |
| 2015/0336271 A1* | 11/2015 | Spicer | B25J 9/1697 428/195.1 |
| 2015/0366504 A1* | 12/2015 | Connor | A61B 5/6804 600/301 |
| 2016/0042199 A1* | 2/2016 | Joharapurkar | G06F 21/71 726/34 |
| 2016/0073956 A1* | 3/2016 | Ghazarian | A61B 5/6843 340/870.07 |
| 2016/0124078 A1* | 5/2016 | Du | G01S 17/36 356/5.1 |
| 2016/0154981 A1* | 6/2016 | Wesselhoff | G06F 21/87 726/34 |
| 2016/0187223 A1* | 6/2016 | Preston | G01B 11/161 356/73.1 |
| 2016/0320532 A1* | 11/2016 | Purchase | G02B 5/0231 |
| 2017/0135214 A1* | 5/2017 | Ray | H05K 1/0296 |

* cited by examiner

TAMPER DETECTION CIRCUIT ASSEMBLIES AND RELATED MANUFACTURING PROCESSES

CROSS-REFERENCE TO RELATED APPLICATION

This application claims priority to U.S. Provisional Application No. 62/092,644, filed Dec. 16, 2014, the disclosure and content of which is incorporated herein by reference in its entirety as if set forth fully herein.

BACKGROUND

The level of physical security required in cryptography products continues to increase and it has become difficult to meet security requirements with currently deployed technologies. The security requirements can include being able to electronically detect whenever unauthorized access is made to protected cryptography modules and other electronic components. Various protection schemes have been proposed that wrap an electrically conductive mesh around protected components, and provide a monitoring circuit that generates an alert signal if the conductive mesh is broken. One limitation of these schemes is that the conductive meshes are susceptible to electrical manipulation that allows the supposedly protected components to be accessed without triggering an alert signal from the monitoring circuit.

SUMMARY

Some embodiments of the present disclosure are directed to a tamper sensor assembly that includes a lid having a surface and a sensor substrate on the surface of the lid. The sensor substrate has conductive lines that extend across at least a major portion of the surface of the lid and conform to three dimensional characteristics of the surface of the lid. The security processor is electrically connected to the conductive lines of the sensor substrate and is configured to identify occurrence of tampering with the lid based on an electrical characteristic of signals conducted through the conductive lines, and to perform an anti-tampering operation responsive to identifying occurrence of tampering.

The width and/or thickness of the conductive lines and/or pitch between adjacent ones of the conductive lines can be controlled based on and/or affected by the localized three dimensional characteristics of the surface of the lid where segments of the conductive lines are formed. The resulting structural randomization of the conductive lines substantially increases the likelihood that a conductive line will become broken during any attempt to mill or ablate an outer surface of the lid to reach the conductive lines or during any attempt to otherwise avoid reaching the conductive lines while penetrating the lid. Moreover, the structural randomization increases the difficulty presented to any attempt to remotely sense and map locations of the conductive lines.

Further embodiments are directed to various structural configurations of the conductive lines, structural configurations of the lids forming interior spaces for anti-tampering storage of electronic components, and operations by the security processor for identifying occurrence of tampering with the lid and responsively performing anti-tampering operations.

Other assemblies, methods, and computer program products according to embodiments of the inventive subject matter will be or become apparent to one with skill in the art upon review of the following drawings and detailed description. It is intended that all such additional assemblies, methods, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
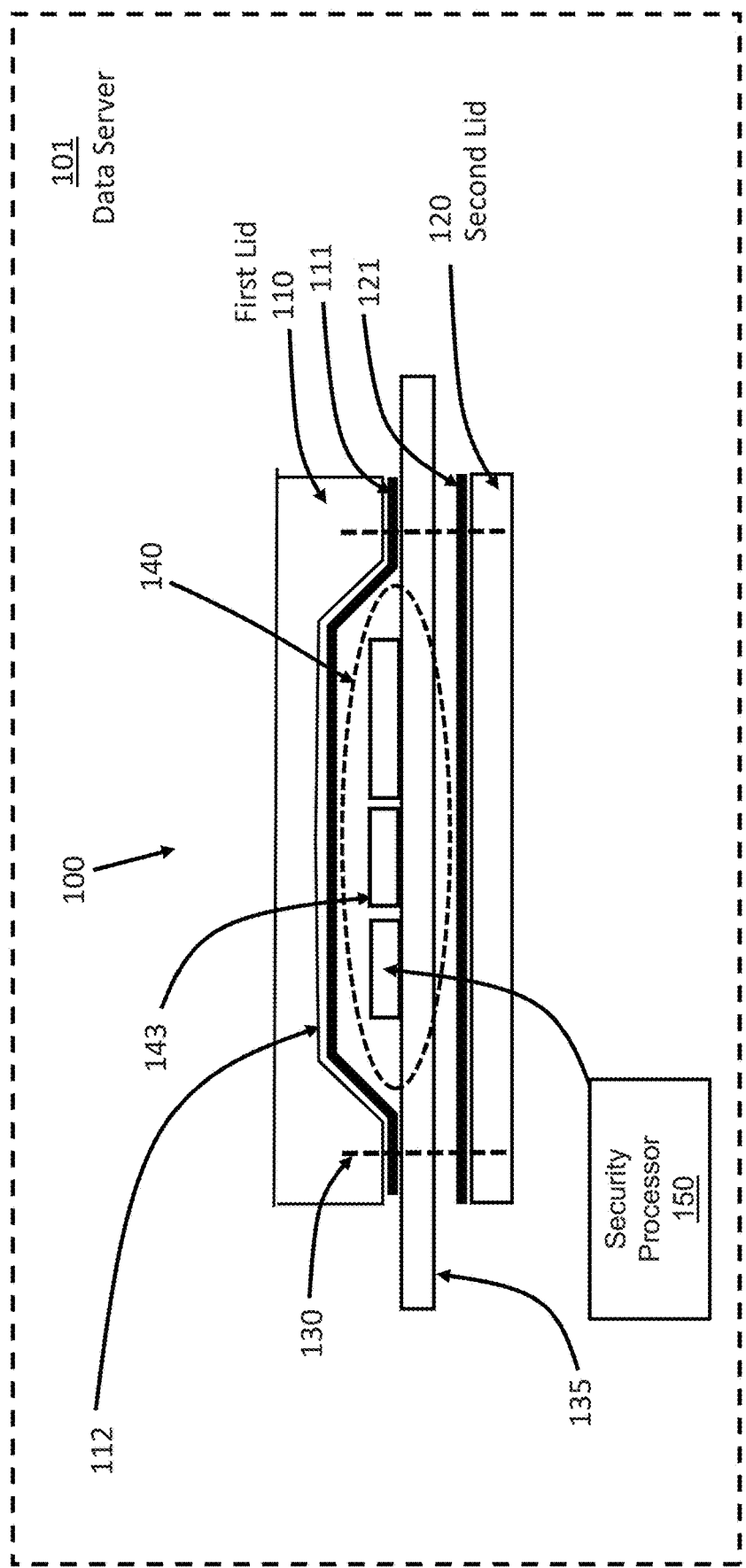
FIG. 1 illustrates a tamper sensor assembly configured to detect tampering of protected equipment in accordance with some embodiments.

Referring to FIG. 1, a tamper sensor assembly 100 is shown in accordance with some embodiments. The tamper sensor assembly 100 may be included within a computer based data server 101 to detect attempts to tamper with cryptographic electronic components 143 protected therein. Although various embodiments are disclosed herein in the context of the tamper sensor assembly 100 protecting cryptographic electronic components, these and other embodiments are not limited thereto and may be applied to detecting tampering with any sort of component that is protected by the assembly 100, including, but not limited to, data storage drives (e.g., electromagnetic disk drives), flash memory devices, magnetic memory devices, microprocessors, analog circuitry, mechanical components, etc.

In the illustrated non-limiting embodiment, the tamper sensor assembly 100 includes a first lid 110 (e.g., top lid) and a second lid 120 (e.g., bottom lid). The first lid 110 can be connected to the bottom lid 120 using interconnects 130, with a recessed surface 112 of the first lid 110 forming a tamper secure space 140 (indicated by the dashed oval) that encloses the cryptographic electronic components 143. The interconnects 130 may include screws or other connector mechanisms for securely coupling the first lid 110 and the second lid 120. The first lid 110 has a first sensor substrate 111 formed thereon or attached thereto. The second lid 120 has a second sensor substrate 121 formed thereon or attached thereto. Although the first and second lids 110 and 120 have both been illustrated as having respective sensor substrate 111 and 121, in some other embodiments only one of the lids has a sensor substrate.

Although the first lid 110 has been illustrated as having a recessed surface while the second lid 120 has been illustrated as being flat in the embodiment of FIG. 1, other embodiments are not limited thereto. Sensor substrates may be formed on or attached to any number of lids or other enclosure surfaces having any shape (e.g., curved, flat, etc.) and which are connectable in any configuration to provide an interior space that can be used to least partially enclose, or more preferably entirely enclose, electronic components 143 that are to be protected from tampering. The lids 110 and 120 may be formed from any type of material (e.g., metal, plastic, ceramic, composite, etc.). When the lids have an electrically conductive surface facing conductive lines of the sensor substrates, an insulating layer can be formed across the lid surface to avoid causing shorting of the conductive lines of the sensor substrates. In another embodiment, first and/or second sensor substrates 111,121 are formed directly on the board 135 and/or on another structure within the tamper secure space 140.

The cryptographic electronic components 143 can be mounted to a board 135 which may be a printed circuit board, a printed assembly board, an integrated circuit assembly, and/or a populated electronic board populated with the cryptographic electronic components 143. The interconnects 130 may secure the board 135 to the first and second lids 110 and 120. As will be described below, the first and second sensor substrates 111 and 121 can be formed on an interior surface and/or an exterior surface of the first and second lids 110 and 120, respectively, by manufacturing processes that may include three dimensional (3D) printing of conductive line patterns on one or more surfaces of the respective lids 110 and 120. The first and second sensor substrate 111 and 121 may alternatively or additionally be disposed within the first and/or second lids 110 and 120 (formed therein during manufacturing of the lids). The first and second sensor substrate 111 and 121 may alternatively or additionally be printed on flexible sheets that are attached to the respective first and second lids 110 and 120.

Potted material, such as an epoxy or other gasket material, can be placed within the tamper secure space created between the first lid 110 and the second lid 120 to further protect the secure electronic assembly (i.e., the cryptographic electronics). This material, or an electromagnetic interference (EMI) gasket material, can be configured to strongly adhere to interior surfaces of the lids 110 and 120 the first and second sensor substrate 111 and 121, the board 135, and the cryptographic electronic components 143, such that a person's attempt to separate the first and second lids 110 and 120 to expose the cryptographic electronic components 143 would result in physical destruction of at least a portion of the assembly 100 including the first and second sensor substrate 111 and 121 (e.g., breaking sensor line patterns of the sensor substrates 111 and 121 described below).

The cryptographic electronic components 143 can include a security processor 150 that is communicatively connected to the first sensor substrate 111 and to the second sensor substrate 121 to monitor any defined types of signal changes through the sensor substrate 111 and 121 that are indicative of tampering with the tamper sensor assembly 100. The security processor 150 can be configured to detect physical changes, electrical changes, temperature changes, and/or motion of the tamper sensor assembly 100. The security processor 150 may preferably reside within the tamper secure space 140 as illustrated, although the security processor 150 may instead reside outside the tamper secure space 140. As will be explained in further detail below, the security processor 150 can execute computer program code that is configured to calibrate its operations to adapt to unique configurations of sensor line patterns and operational parameters of the tamper sensor assembly 100 which may be due in-part to variations introduced during manufacturing.

In some embodiments, the interconnects 130 couple the board 135 between the first lid 110 and the second lid 120 so that the cryptographic electronics 143 are retained in the tamper secure space 140. The interconnects 130 can include spring loaded pins connected to a tamper circuit monitored by the security processor 150 to detect electrical change through the spring-loaded pins that is indicative of separation of the first lid 110 and the second lid 120. The spring loaded pins may be electrically connected to sensor line patterns extending at least partially within holes in the lids 110 and 120 through which the spring loaded pins extend, and the security processor can monitor electrical signals through the sensor line patterns to detect displacement of the spring loaded pins. The spring loaded pins may be configured to be activated only by physical disruption, for example, responsive to a person disassembling the first and second lids 110 and 120 of the tamper sensor assembly 100. The security processor 150 monitors an electrical characteristic of signals conducted through the conductive lines of the sensor line patterns to identify when any one of the interconnects ceases being electrically connected to at least one of the conductive lines which indicates the interconnect has become loosened from one of the holes.

In another embodiment, the first and/or second sensor substrates 111,121 are connected to the board 135 (e.g., printed circuit board) using one or more interconnects that may or may not also connect to holes in the first and/or second lids 110,120. The interconnects can include spring loaded pins that electrically connect to sensor line patterns, formed on a substrate layer on the board 135, and a tamper circuit monitored by the security processor 150 to detect electrical change through the spring-loaded pins that is indicative of tampering with the board 135.

Figure 2A:
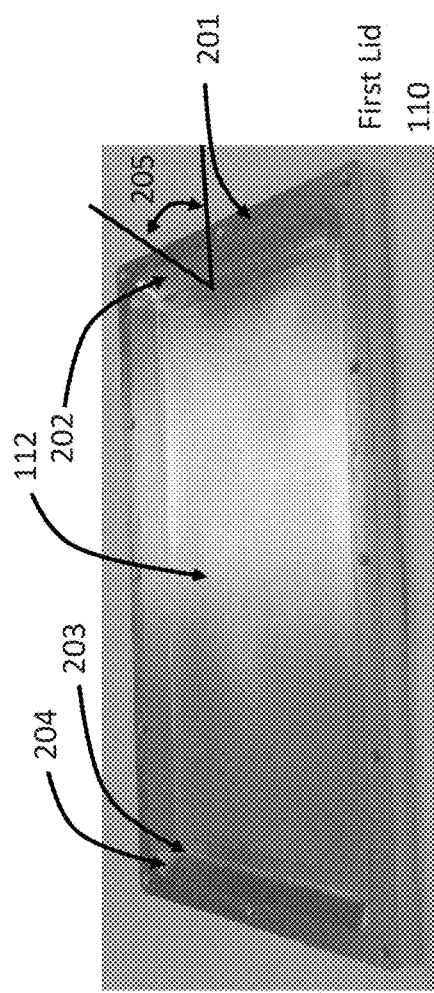
FIGS. 2A-2B illustrate a pair of lids of the tamper sensor assembly of FIG. 1 in accordance with some embodiments.
Figure 2B:
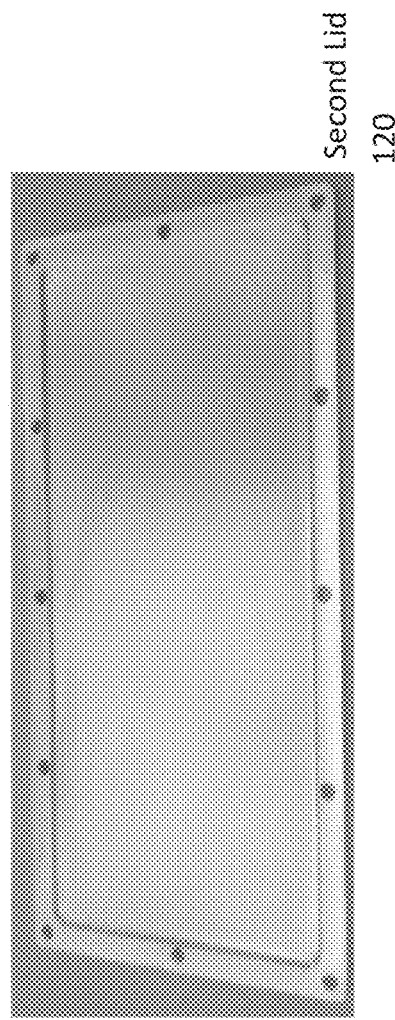

FIG. 2A illustrates the first lid 110 in bare form, that is without the first sensor substrate 111. FIG. 2B illustrates the second lid 120 in bare form, that is without the second sensor substrate 121. The perspective views of FIGS. 2A and 2B show certain notable features that enable manufacturing of sensor line patterns thereon having thin conductive lines (e.g., 50 μm) with an average thickness of, for example, 1 μm. Features of the lids that enable more reliable formation of sensor line patterns include reducing slope of defect pits in the lid surfaces to less than 45 degrees, such as by smoothing (e.g., mechanical polishing) scratches in the surfaces and/or by forming (e.g., depositing) a non-conductive substrate layer (e.g., 3 um thick dielectric layer) across the surface to reduce slopes of the effects in a lid surface. In another arrangement, electropolishing is performed to further smooth the surface. Other features include avoiding formation or removing projections or burrs extending upward from the surfaces that could cause shorting between conductive lines and/or result in breakage of the conductive lines. Inside corners 204 and outside corners 205 are formed with a broad radius a minimum of 0.5 mm. A sloped surface 202 extending from the non-recessed surface 201 to the recessed surface 112 is formed to have an angle 205 that is than 45 degrees, which enables the sensor line patterns to be formed on the sloped surface 202 without breakage or discontinuity of the lines.

Figure 3:
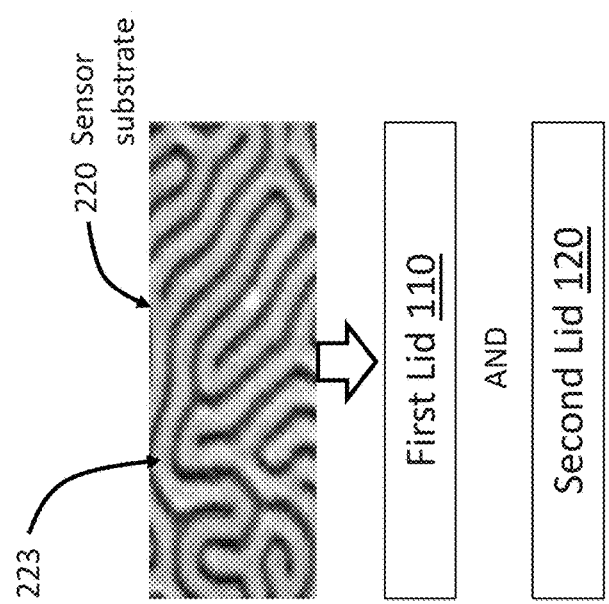
FIG. 3 illustrates a sensor substrate that can be formed on the pair of lids of FIGS. 2A-2B in accordance with some embodiments.

FIG. 3, shows a magnified view of a sensor substrate 220, suitable for the first lid 110 and second lid 120, in accordance with some embodiments. The substrate 220 includes a sensor line pattern having electrically conductive lines 223 that extend across a major surface of the first lid 110 and across a major surface of the second lid 120. The security processor 150 monitors signals conducted through the lines 223 to detect tampering, for instance, when a tool is used to drill through the first lid 110 or if a lid is removed or tampered with which results in breaking signal conductivity through one or more of the lines 223.

In some embodiments, the sensor substrate 220 is a three-dimensional (3D) mesh line pattern formed on and extending across an outside surface of each of the first lid 110 and the second lid 120. In a second embodiment, the sensor substrate 220 is a three-dimensional (3D) mesh line pattern formed on and extending across an inside surface of each of the first lid 110 and the second lid 120. In another embodiment, the sensor substrate 220 is a three-dimensional (3D) mesh line pattern formed as a molded layer that is attached to (e.g., adhesively attached to) and extends across an outside surface of each of the first lid 110 and the second lid 120. In yet another embodiment, the sensor substrate 220 is a three-dimensional (3D) mesh line pattern formed as a molded layer that is attached to (e.g., adhesively attached to) and extends across an inside surface of each of the first lid 110 and the second lid 120.

Figure 5:
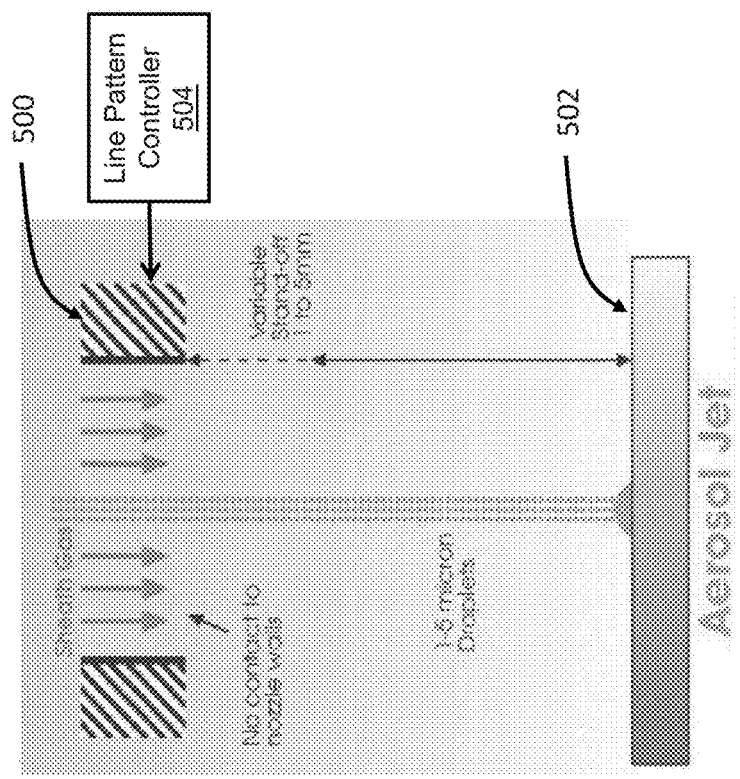
FIG. 5 illustrates an aerosol jet injection nozzle controlled by a line pattern controller to form sensor line patterns in accordance with some embodiments.
Figure 4:
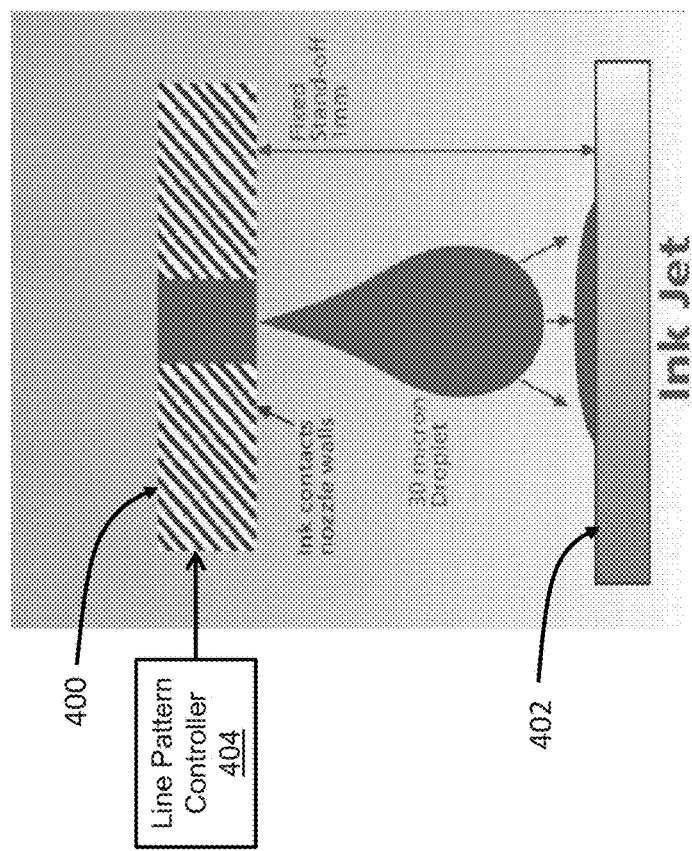
FIG. 4 illustrates an ink jet print head controlled by a line pattern controller to form sensor line patterns in accordance with some embodiments.

The sensor substrate 220 can be formed on surfaces of the lids 110 and 120 and/or directly on the board 135 by processes that include silkscreen printing, flexography printing, inkjet printing, and/or aerosol jet printing conductive lines onto the surface. Silkscreen printing processes may form lines having widths as small as 100 μm. Flexography printing can include passing a flexible layer across a roller to form conductive line patterns thereon, and attaching the flexible layer to a surface of a lid. FIG. 4 illustrates an inkjet printing assembly that includes a line pattern controller 404 (e.g., processor, memory, and head actuator) that controls movement of an inkjet print head 400 and controls injection of conductive material droplets through the print head 400 to form pixels arranged to provide sensor line patterns on a substrate, accordance with some embodiments. Inkjet printing may form lines having widths as small as 60-100 μm. FIG. 5 illustrates an aerosol jet printing assembly that includes a line pattern controller 504 (e.g., processor, memory, and head actuator) that controls movement of an injection nozzle 500 and controls the flow of conductive material blown through the injection nozzle 500 by a sheath gas to provide high density micro droplets in a continuous stream that is tightly focused to form sensor lines on a substrate, in accordance with some embodiments.

In another embodiment the sensor substrate 220 is formed on surfaces of the lids 110 and 120 and/or directly on the board 135 by a selective laser sintering process. Using selective laser sintering, a line pattern controller scans a laser onto a surface to thermally fuse together small particles of an electrically conductive material (e.g., metal powder coating) to form conductive line patterns. The line pattern controller may use a defined conductive line pattern template to form a defined pattern and/or may use a randomization algorithm to provide a defined level of randomization to the individual conductive line within a pattern.

Both inkjet printing and aerosol jet printing can provide non-contact vector printing. However the injection nozzle 500 used for aerosol jet printing can be more resistant to clogging by the conductive material blown, and can provide, for example, as small as 10 μm line widths with a 5 mm standoff of the injection nozzle 500 from the lid surface 502 with as thin as 1 μm line thicknesses. In these and other embodiments, the conductive material can be disposed on, fabricated on, integrated onto or into, attached, affixed or applied thereon, sprayed, inked, flowed or printed onto, the first lid 110 and/or the second lid 120. When using aerosol jet printing, it has been determined that lines can be formed on 45 degree sloped surfaces extending from a non-recessed surface to a recessed-surface of the lid, however reduced mass flow rate of the conductive material through the injection nozzle 500 may be needed. Aerosol jet printing on 30 degree sloped surfaces has been reliably performed without necessitating use of a reduced mass flow rate. Aerosol jet printing can be performed on slopes up to 90 degrees by tilting the injection nozzle 500 toward the sloped surface (e.g., tilt the injection nozzle 500 by 45 degrees toward a 90 degree sloped surface to maintain no more than a 45 degree relative angle therebetween).

The conductive material used to form lines of the patterns may include nanosilver ink, although other conductive materials may be used. After forming the conductive line patterns by inkjet printing and/or aerosol jet printing, the lid may be heated to a temperature sufficient to partially flow together the droplets formed on the lid and create more uniform lines.

Figure 6B:
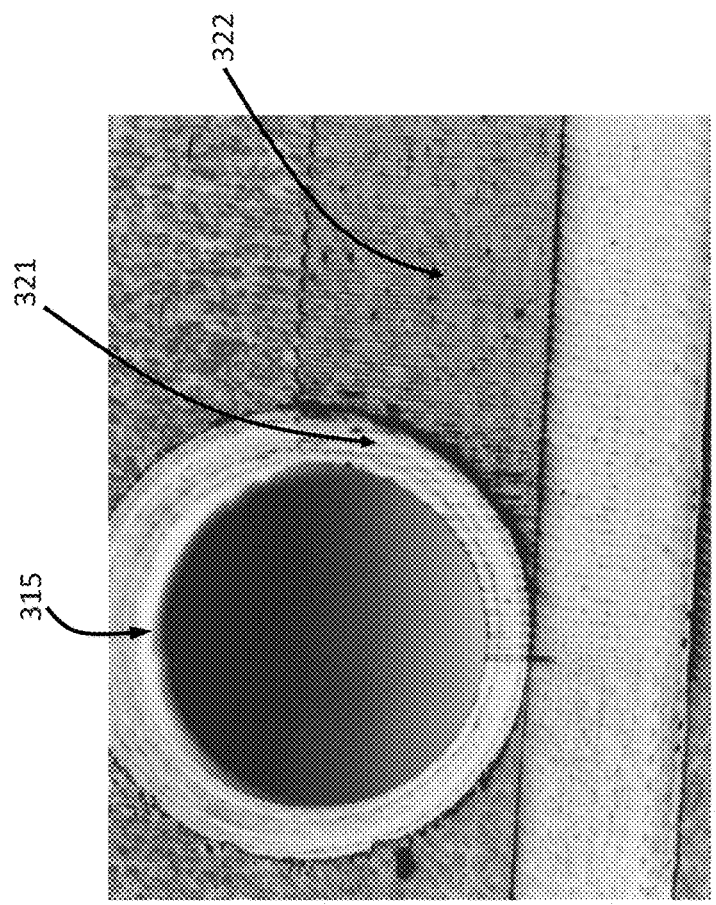
FIGS. 6A-6C illustrate features of one of the lids and sensor line patterns formed thereon in accordance with some embodiments.
Figure 6A:
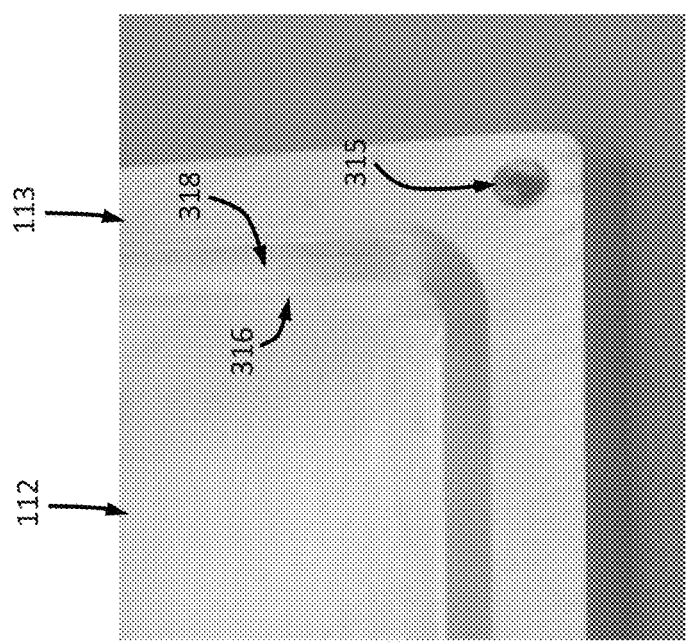
Figure 6C:
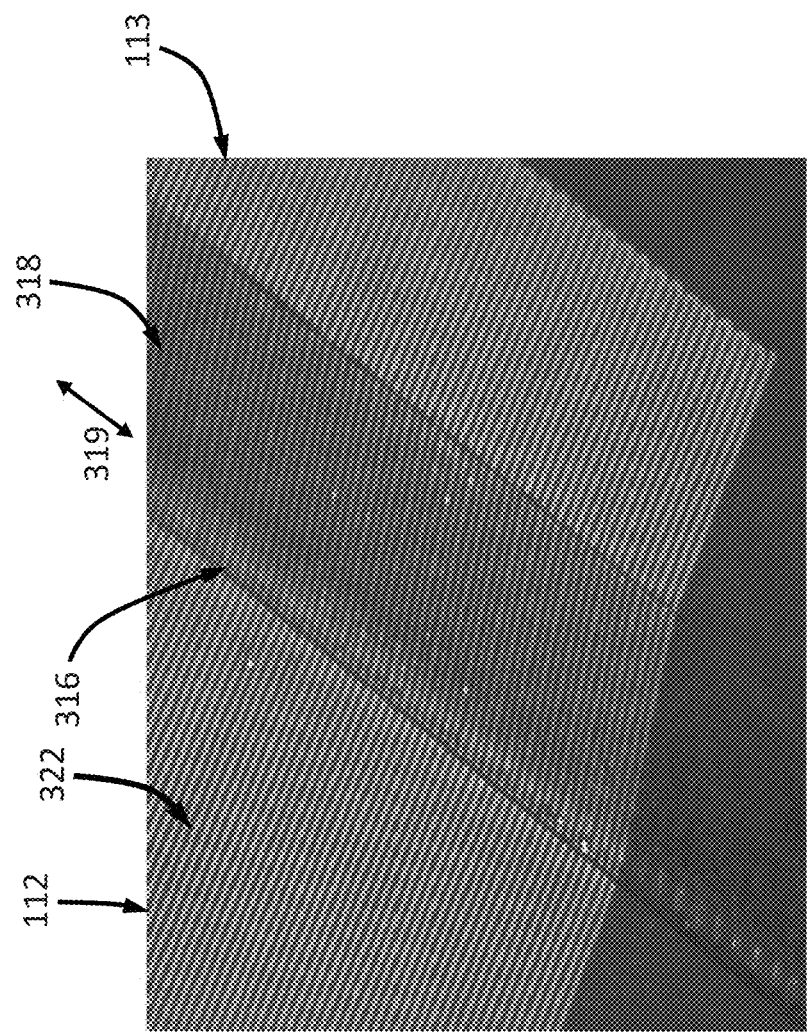

FIGS. 6A-6C illustrate features of the tamper sensor assembly in accordance with some embodiments. FIG. 6A shows a perspective view of some features of the second lid 120 that include a recessed surface 112 that is recessed 5 mm relative to the non-recessed surface 113, and has a minimum radius of 0.5 mm (tightness of turn) for the corner 316 transitioning from the recessed surface 112 to a sloped surface 318 and from the sloped surface 318 to the non-recessed surface 113, which facilitates reliable formation of narrow width sensor line patterns. A threaded screw hole 315 is illustrated which allows pass-through of one of the interconnects 130. FIG. 6B shows a close-up of the screw hole 315 of FIG. 6A and illustrates a serpentine sensor line pattern 322 that extends across the surface of the second lid 120 and down into the screw hole 315. The lids 110 and 120 may alternatively or additionally be attached to each other by other processes including, but not limited to, use of solder material and a solder reflow process and/or an adhesive to attach the lids 110 and 120 to each other and/or to the board 135.

A threaded screw residing in the screw hole 315 can electrically short together a plurality of the sensor lines in the screw hole 315. The security processor 150 can monitor a signal conducted through the serpentine sensor line pattern 322 to identify if a change in impedance or measurable electrical characteristic of the signal indicates that the screw has been backed out of the screw hole 315 resulting in electrical disconnection of the previously shorted plurality of sensor lines, which the security processor 150 can determine to be an indication of tampering.

FIG. 6C shows a close-up of the sloped surface 318 of the lid 120 of FIG. 6A and the sensor line pattern 322 extending from the recessed surface 112 down the sloped surface 318 to the non-recessed surface 113. When using aerosol jet printing it has been determined that conductive lines can be reliably printed up and/or down the sloped surface 318, however attempting to print the conductive lines parallel to the sloped surface 318 along direction 319 can cause excessive misalignment of the micro-droplet stream from the injection nozzle 500 toward the sloped surface 318 and undesirably result in discontinuous line formation (i.e., fragmented lines instead of continuous conductive lines) and/or downhill running of deposited material thereby shorting adjacent lines.

As will be explained in further detail below, the security processor 150 may identify when externally applied electromagnetic materials are applied in a side channel form of attack to obtain access to the cryptographic electronic components 143. In such cases, an epoxy material inserted into the tamper secure space 140 may also include compositional (or molecular) markers that in conjunction with the sensor substrate responds in a predetermined signal range that can be monitored by the security processor 150 to detect tampering. For example, under normal operating conditions where no externally applied EMI signals are present or expected, the security processor 150, performs signal pattern comparisons for default conditions, and upon detection of an unknown EMI signal which typifies the tampering is occurring and performs responsive anti-tampering operations which may include erasing memory, damaging electronic circuitry, communicating an alert message, etc. More particularly, the anti-tampering operation performed by the security processor 150 can include erasing content of a memory circuit of an electronic component stored within the tamper secure space 140, generating a voltage above a threshold level through a connection to an electronic component stored within the interior space that is sufficient to permanently damage operation of an electronic circuit of the electronic component, and/or communicating an alert message through a communication interface of the security processor 150 indicating the occurrence of tampering.

The security processor 150 may generate a signal(s) that is provided to input nodes of the conductive lines and receive signals from output nodes of the conductive lines to determine whether any one or more of the conductive lines has an incomplete (e.g., severed) conduction path between the respective input and output nodes. The conductive lines can also serve as antennas to receive externally applied EMI signals. The security processor 150 may filter or otherwise isolate any EMI interference component having the defined characteristic that is present in the signals received from the output nodes. The security processor 150 may be configured to identify occurrence of tampering with a lid 110,120 responsive to detecting a threshold difference between an EMI component having a defined characteristic in the signals from one group of the conductive lines (e.g., one set of output nodes) of the sensor substrate extending across one portion of the lid 110,120 and an EMI interference component having the defined characteristic in the signals from another group of the conductive lines (e.g., another set of output node) of the same or another sensor substrate extending across another portion of the lid 110,120.

Figure 7:
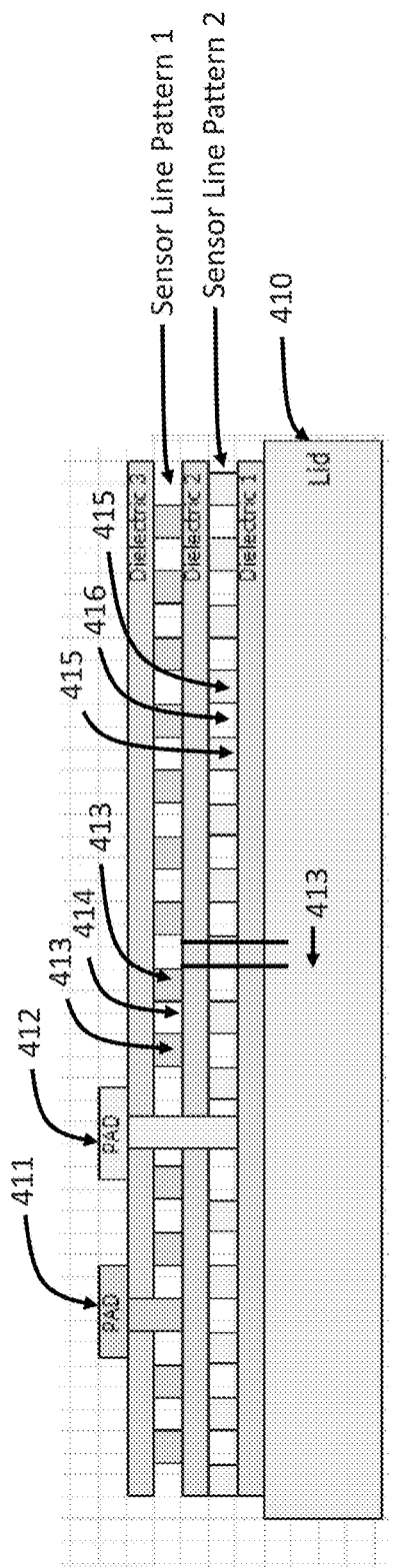
FIG. 7 is a cross-sectional illustration of an overlaid arrangement for dual sensor line patterns in accordance with some embodiments.

FIG. 7 is a cross-sectional illustration of an overlaid arrangement for dual sensor line patterns (sensor line pattern 1 and sensor line pattern 2) stacked on a lid 410 surface in accordance with some embodiments. The sensor line pattern 1 includes a conductive line pattern that has been illustrated in the cross-sectional view as conductive lines 413 that are spaced apart with insulating material 414 between adjacent pairs of the conductive lines 413. The sensor line pattern 2 similarly includes a conductive line pattern that has been illustrated in the cross-sectional view as conductive lines 415 that are spaced apart with insulating material 416 between adjacent pairs of the conductive lines 415. A first dielectric layer (dielectric 1) is provided between the sensor line pattern 2 and the lid 410. A second dielectric layer (dielectric 2) extends across the sensor line pattern 2, and the sensor line pattern 1 is stacked on the second dielectric layer. A third dielectric layer (dielectric 3) extends across the sensor line pattern 1. A first electrical contact pad 412 extends through the third dielectric layer to electrically contact a line of the sensor line pattern 1. A second electrical contact pad 412 extends through the third and second dielectric layers, without contacting a line of the sensor line pattern 1, to electrically contact a line of the sensor line pattern 2. In FIG. 7, an example vertical height of the conductive lines 413 and 415 is 1 µm and an example vertical thickness of each of the first, second, and third dielectric layers is 3 µm.

A signal generator (described below) can provide different signals to the first and second electrical contact pads 411 and 412 for conduction through the respective sensor line patterns 1 and 2. Alternatively, the security processor 150 can monitor signals output by the first sensor line pattern 1 and the second sensor line pattern 2 via the respective contact pads 411 and 412.

Figure 9:
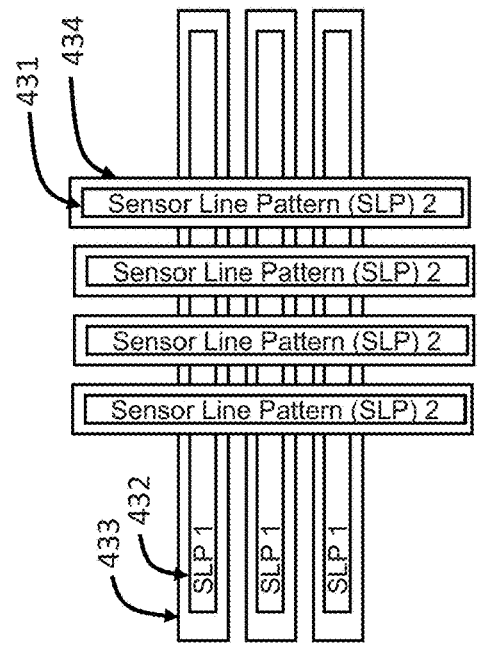
FIGS. 8-9 are plan views of alternative configurations of two sensor line patterns in accordance with some embodiments.
Figure 8:
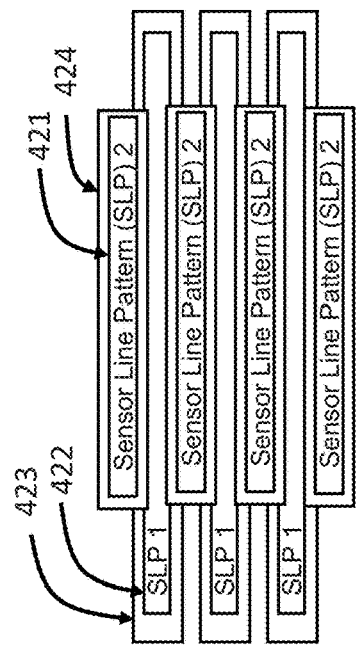

The sensor line patterns may alternatively be provided on a single or plural planar surface with lines of one pattern being electrically isolated from lines of the other pattern, and the line forming a staggered other pattern. FIG. 8 is a plan view of the sensor line pattern ("SLP") 2 overlaid on the sensor line pattern 1 with parallel respective conductive lines 421 and 422 laterally spaced apart in a staggered arrangement on respective dielectric material patterns 424 and 423. FIG. 9 is a plan view of the sensor line pattern ("SLP") 2 overlaid on the sensor line pattern 1 with perpendicular respective conductive lines 431 and 432 laterally spaced apart in a staggered arrangement on respective dielectric material patterns 433 and 434.

Figure 12:
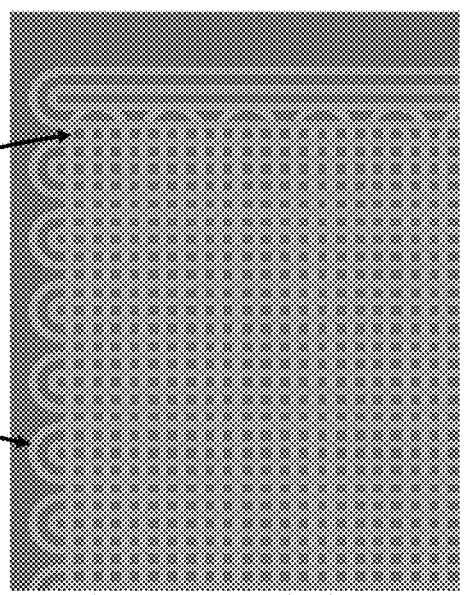
FIGS. 10-12 illustrate sensor line patterns according to some embodiments.
Figure 11:
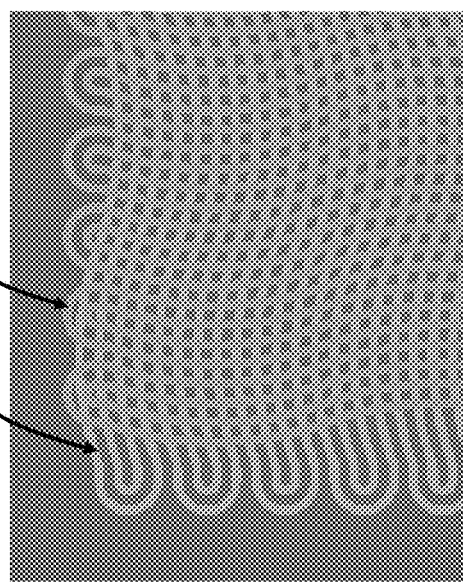
Figure 10:
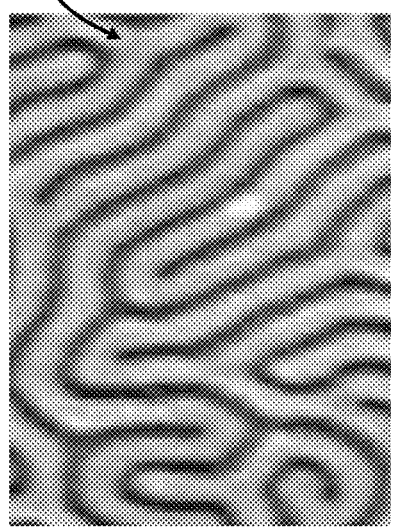

FIGS. 10-12 illustrate sensor line patterns according to some embodiments. FIG. 10 shows a random pattern of conductive lines 511 formed on a substrate. The illustrated lines 511 may be portions of a single continuous line of a same sensor line pattern, or the illustrated lines 511 may be portions continuations of different lines of different sensor line patterns. The pattern may be random and different between different sensor substrates, or may be repeated patterns that are selected by a computer from a defined set of patterns to form a sensor line pattern.

Figure 16:
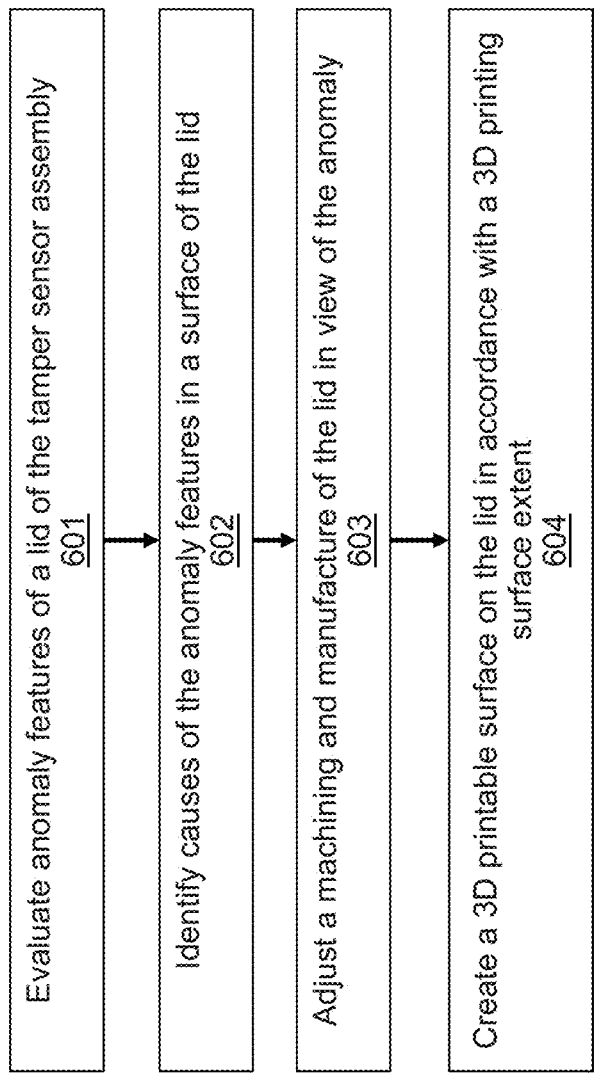
FIG. 16 illustrates a manufacturing process for 3D printing suitable for use with a tamper sensor assembly in accordance with some embodiments.

The shape and pattern formed by the conductive lines can controlled (e.g., via the line pattern controller 404 and 504) responsive to an algorithm provided in program code that causes a defined amount of randomness and/or that modifies the pattern and/or characteristics of a segment of a line formed in the pattern based on characteristics of the substrate (e.g., lid surface) that have been determined and/or formed through the process of FIG. 16. For example, width and/or thickness of a line segment and/or pitch between adjacent line segments of the pattern can be controlled based on localized characteristics of the substrate where the line segment will be formed (e.g., local surface roughness, local surface slope relative to the deposited stream of conductive material, etc.).

FIG. 11 shows a set of undulating patterned lines 521 primarily extending vertically to form a first sensor line pattern, and another set of undulating patterned lines 522 primarily extending horizontally to form a second sensor line pattern underneath the first sensor line pattern. The first and second sensor line patterns of FIG. 11 are separated by a dielectric layer (not shown for ease of illustration). FIG. 12 shows a set of straight patterned lines 523 primarily extending vertically to form a first sensor line pattern, and another set of straight patterned lines 524 primarily extending horizontally to form a second sensor line pattern underneath the first sensor line pattern. The first and second sensor line patterns of FIG. 12 are separated by a dielectric layer (e.g., as shown as in FIGS. 7-9 and 17). In some arrangements the first and second patterns are asymmetric. Any of these pattern configurations can be disposed or fabricated onto the first lid 110 and/or the second lid 120.

Figure 13:
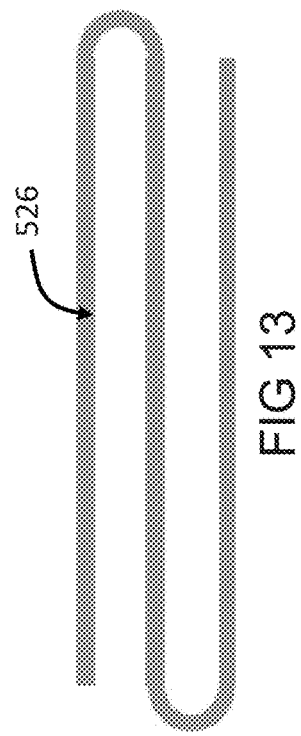
FIGS. 13-15 illustrate patterns that may be preferable for formation when using aerosol jet printing according to some embodiments.
Figure 15:
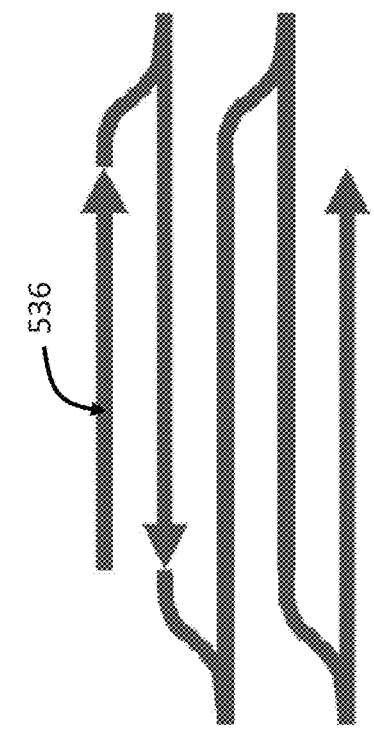
Figure 14:
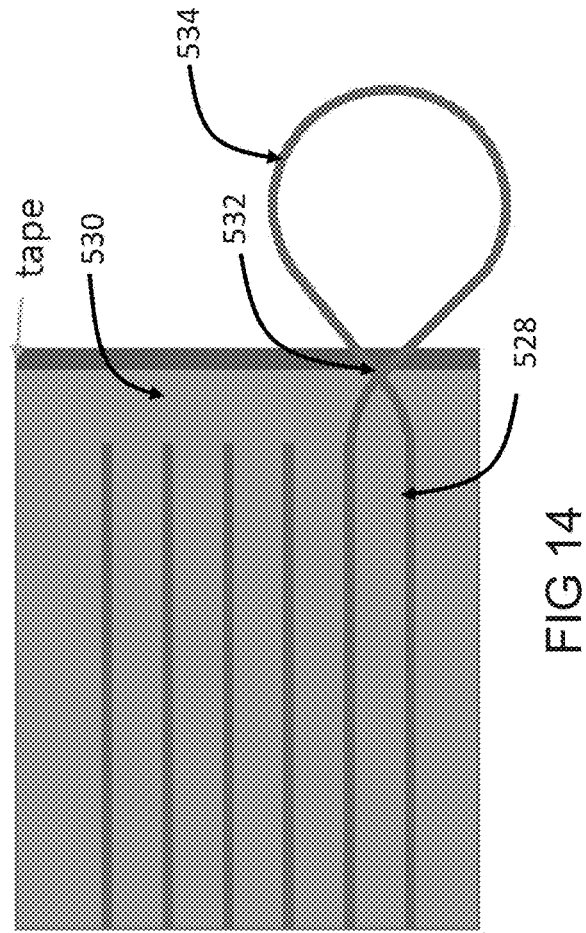

FIGS. 13-15 illustrate patterns that may be preferable for formation when using aerosol jet printing. FIG. 13 shows a pattern of a line 526 that reverses direction through large radius turns which reduce acceleration changes necessary on the injection nozzle 500 (FIG. 5) to following the turns, which can enable reliable formation of a conductive line throughout the turn with consistent width and free of breaks.

FIG. 14 shows another pattern of a line 528 that reverses direction by crossing-over itself at node 532 while located on a surface of the substrate 530 (e.g., lid) and performing a large radius turn 534 while located off of the substrate 530. Electrical interconnection of the parallel lines 528 is provided at the cross-over node 532. The pattern of FIG. 14 may be particularly advantageous for use with aerosol jet printing because it can allow a substantial reduction in the acceleration changes necessary for the injection nozzle 500 (FIG. 5) to follow the turn 534, which can further enable reliable formation of a conductive line having more consistent width and free of breaks. The pattern of FIG. 14 may require lower acceleration changes on the injection nozzle 500 (FIG. 5) compared to the pattern of FIG. 13.

FIG. 15 shows a pattern 536 for movement of the injection nozzle 500 (FIG. 5) to form a corresponding line on a substrate (e.g., lid). The pattern 536 follows curves having parabolic shapes toward connection to an adjacent line, which requires lower acceleration changes to the injection nozzle 500 (FIG. 5) while following the pattern.

Figure 17:
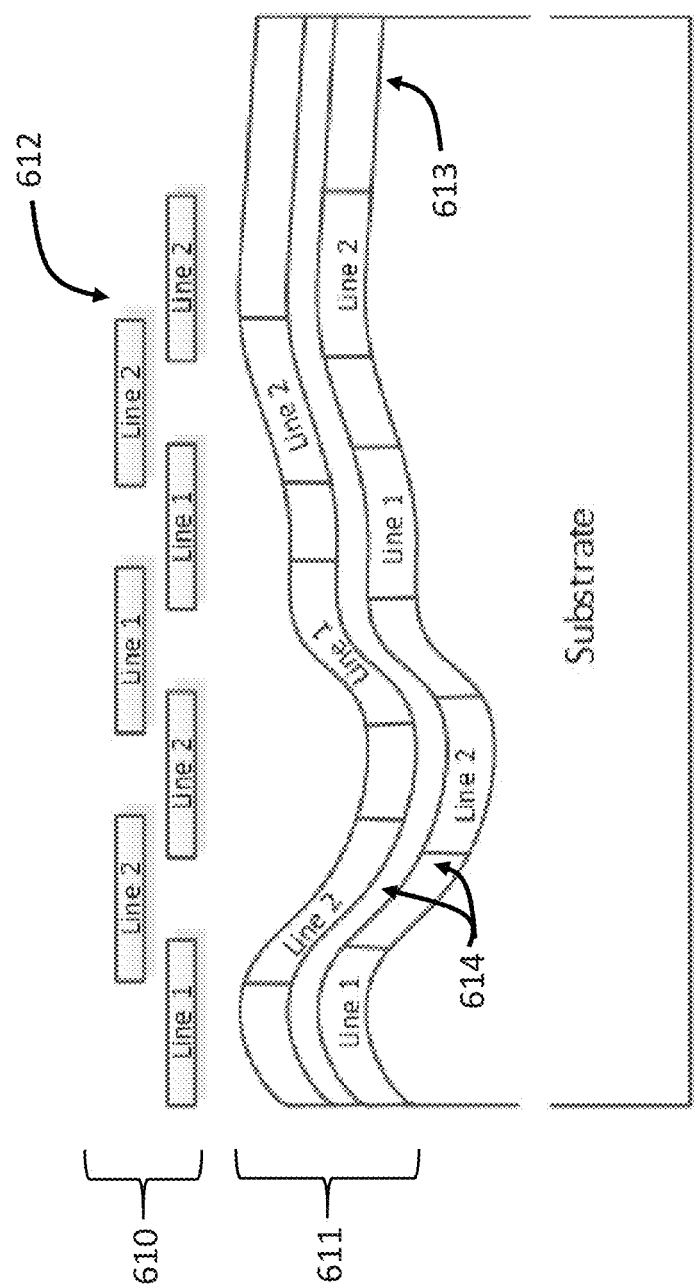
FIG. 17 illustrates a cross-sectional view of two line patterns formed on a substrate in accordance with some embodiments.

FIG. 16 illustrates a manufacturing process comprising steps of a method for 3D printing suitable for use with a tamper sensor assembly in accordance with some embodiments. It should be noted that the method steps are not limited to the order shown, and may include more or less than those shown. Reference will also be made to FIG. 17 which illustrates work product of the process 600. FIG. 17 illustrates a cross-sectional view 610 of two line patterns that will be formed on a substrate. A first line pattern is formed from "lines 1" which are electrically connected to each other. A second line pattern is formed from "lines 2" which are electrically connected to each other. As illustrated, the lines are arranged to alternate horizontally and vertically, such that cross-sectional segments of line 1 are arranged to occur on a first plane, followed by on a second plane, and then again on the first plane. Cross-sectional segments of line 2 similarly alternate between the first plane and the second plane, and are disposed between adjacent segment pairs of line 1.

FIG. 17 also illustrates a cross-sectional view 611 in which the first and second line patterns are formed to conform to a non-planar undulating surface 613 of the substrate. The substrate may be a conductive or non-conductive material. When the substrate is a conductive material, a dielectric layer would be formed between the conductive segments of line 1 and line 2 and the substrate. A dielectric layer 614 extends between the spaced apart segments of line 1 and line 2. The conductive lines of FIG. 17 may be formed by 3D printing circuit, such as using aerosol jet printing on the first and/or second lids 110 and 121.

In FIG. 16 the manufacturing process can include the steps of evaluating (601) anomaly features (e.g., surface roughness, scratches, voids, raised projections, etc.) of a lid of the tamper sensor assembly 100, identifying (602) causes of the anomaly features in a surface of the lid, adjusting (603) a machining and manufacture of a surface of the lid based on the anomaly features thereby preparing the lid for 3D printing of a sensor circuit thereon, and creating (604) a 3D printed sensor substrate across the lid.

The 3D printing extent can include evaluating a surface roughness of the lid, which when a surface of the lid is metallic may include evaluating a level of corrosion of the metallic surface. Evaluation of surface roughness may include identifying rough elevated sites, corners and indentions and elevations of the lid to which a 3D printing ink may not reliably form a sufficiently uniform line. The evaluation can include evaluating a scratching extent of the lid, where the scratching extent identifies a depth, width, and/or slope to which a 3D printing ink may undesirably run along scratches and not form a continuous conductive line on the lid. The scratching extent may identify voids, matching marks, tool chatter, pits, projections, burrs and asperities. Pullout and non-uniform anodization of the lid may be analyzed, where analysis of the anodization extent may rate the surface appearance for non-uniformity on a 50 um scale. As one example, the anodization extent may rate a level of residual dye scum that reduces adhesion of a 3D printing ink on the lid.

The step of adjusting (603) a machining and manufacture of the lid may include polishing and electro polishing the surface of the lid to reduce slope of the anomaly features to less than 45° and, more preferably, less than 30°, and/or to reduce a height/depth of the anomaly features. Depending upon the features identified (602), a dielectric coating may be formed across the lid to reduce slope of the anomaly features and/or reduce height/depth of the anomaly features. Thickness of the dialectic coating may be controlled based on the identified (602) features. According to some embodiments, the randomly occurring surface features of the lid can advantageously be used to create randomness in the shape and height of the sensor substrate formed thereon. The location and characteristics of the identified anomaly features can be used to control printing (e.g., aerosol jet printing). The 3D printing creates one or more conductor traces along a 3D surface of the lid to form a sensor circuit suitable for detection of a tampering.

The process step 603 of adjusting a machining and manufacture can also include maximizing a thinness of the one or more conductive lines of the sensor circuit created on the 3D printable surface and an insulation layer between conductors to maximize difficulty to attach to or modify the sensor in a security breach attempt to bypass the lid.

The process step 603 of adjusting a machining and manufacture can also include creating a non-planar topology of the 3D printable surface at a micro scale with respect to a minimum z-axis height of the one or more conductor traces of the sensor circuit to increase the likelihood that a conductive line will be broken responsive to an attempt to mill or ablate the outer surface of the lid.

The process of adjusting a machining and manufacture can also include creating a randomized pattern of the one or more conductor traces of the sensor circuit. This is shown and described previously in FIG. 10.

Referring again to FIG. 17 because the first and second line patterns conform to a non-planar undulating surface 613 of the substrate, the 3D confirmation increases the likelihood that a conductive line will be broken responsive to an attempt to mill or ablate the outer surface of the lid.

The non-planar undulating surface 613 of the substrate may be provided by surface roughness of the substrate. The surface roughness may be controlled by polishing and other processes described above. As explained above, a dielectric may be deposited on the substrate. The dielectric may be patterned to provide a surface roughness that will result in a desired 3D configuration for the sensor pattern printed thereon.

Other potential advantages of creating the very low profile sensors of FIGS. 6B, 6C, 7-15, and 17 include:
  The thin conductive lines are difficult to precisely locate between the insulator layers;
  The thin conductive lines are difficult to precisely locate adjacent to the substrate;
  The thin conductive lines are fragile and thereby difficult to attach to for electrical monitoring by other circuits without resulting in breakage of at least one of the conductive lines which is detectable by the security processor 150; and
  Thinness of the conductive lines reduces their detectability through to x-ray imaging of the sensor substrate.

Potential advantages of using a non-planar sensor topology, such as shown in FIG. 17 with micron scale features include:
  Attempts to uncovering structure of the conductive lines located between a (relatively) thick dielectric layer and substrate would necessitate use of special tools and be highly unlikely to result in adequate determination without breakage of at least one of the conductive lines; and
  Creation of the non-planar topology is inherently randomized which makes learning the location of the sensor by studying one unit of no value for the next unit.

Potential advantages of using randomized sensor line pattern include:
  The time required for a successful attack depends on locating key features of the sensor to attack. Multiple patterns increase the number of trial units needed and attack units needed to complete an attack.
  Irregular sensor line patterns increases the difficulty of mapping individual lines of the patterns using x-ray imaging.

Figure 18:
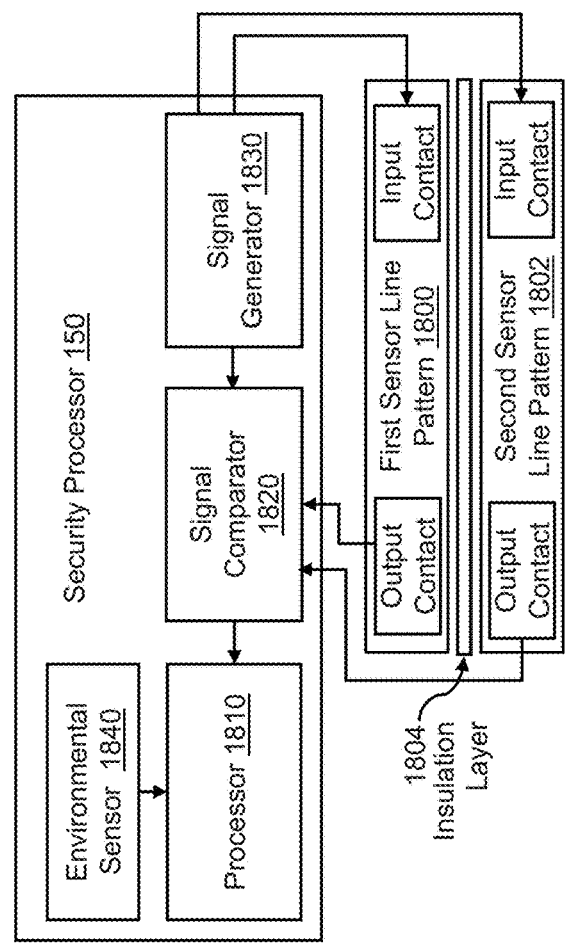
FIG. 18 illustrates a security processor that is electrically connected to monitor electrical characteristics of one or more sensor substrates in accordance with some embodiments.

FIG. 18 illustrates a security processor 150 that is electrically connected to monitor electrical characteristics of one or more sensor substrates in accordance with some embodiments. In the non-limiting example embodiment of FIG. 18, a sensor substrate includes a first sensor line pattern 1800 that is stacked on a second sensor line pattern 1802 with an insulation layer 1804 there between. The first and second sensor line patterns 1800 and 1802 extend across one of the lids 110 and 120. The security processor 150 is configured to detect tampering of the lid by sensing a change in electrical characteristics of one or both of the first and second sensor line patterns 1800 and 1802. The security processor 150 may measure impedance through the first sensor line pattern 1800 separately from measuring impedance through the second sensor line pattern 1802.

Figure 19:
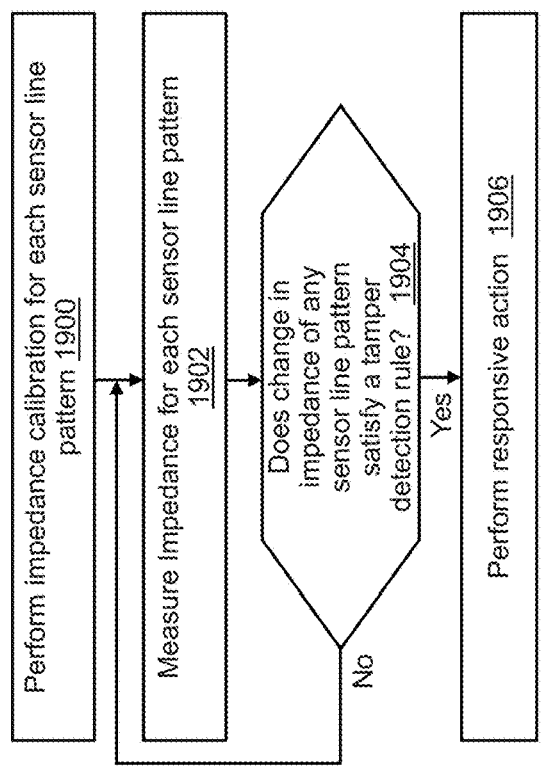
FIG. 19 is a flowchart of operations performed by the processor of FIG. 18 to detect tampering in accordance with some embodiments.

The security processor 150 can include a processor circuit 1810 (processor) which executes computer program code, a signal comparator circuit 1820, and a signal generator circuit 1830. FIG. 19 is a flowchart of operations performed by the processor 1810 to detect tampering. The signal generator 1830 can be configured to supply a same continuous low voltage signal to input contacts of the first and second sensor line patterns 1800 and 1802, or configured to supply different continuous low voltage signals to the input contacts. The signal generator 1830 may output a direct current signal or an oscillating signal. The signal generator 1830 may include an oscillator having a frequency that is controlled responsive to characteristics, for example, resistance, inductance, and/or capacitance of the sensor line patterns 1800 and 1802. In some embodiments, the signal generator 1830 outputs a pseudo-random oscillating signal to the input contacts of the sensor line patterns 1800 and 1802, which can prevent attempts to bypass the sensor line patterns 1800 and 1802 by providing a signal directly to the impedance measurement circuit 1820.

The processor 1810 performs an initial impedance calibration (block 1900) for each of the sensor line patterns 1800 and 1802, which can compensate for differing line lengths, line thicknesses, and electrical characteristics provided during manufacturing of the sensor line patterns 1800 and 1802. The impedance measurement circuit 1820 compares the signals output by the signal generator 1830 and the signals received from the first and second sensor line patterns 1800 and 1802 to provide a comparison signal to the processor circuit 1810. The processor 1810 measures (block 1902) impedance of the first and second sensor line patterns 1800 and 1802 based on the comparison signal. The processor 1810 determines (block 1904) if the impedance in either or both of the first and second sensor line patterns 1800 and 1802 changes by an amount that satisfies a tamper detection rule. An impedance change can be caused by a person cutting a line within one of the patterns 1800 and 1802, creating a short-circuit between lines within the patterns 1800 and 1802, creating a short-circuit between different segments of the same line within one of the patterns 1800 and 1802, etc. When an impedance change satisfies the tamper detection rule, the processor 1810 performs (block 1906) a responsive action that can include erasing data from memory, shutting down the cryptographic electronic components 143, damaging circuitry of the cryptographic electronic components (e.g., applying a power spike to fragile microelectronics, etc.), and/or communicating an alert notification through a wired communication interface and/or a wireless communication interface to a network node.

The security processor 150 may include environmental sensor 1840 that detects movement, temperature, and/or light. The processor 1810 may correspondingly monitor a signal from the environmental sensor 1840 to monitor movement, a change in temperature, and/or light to detect an indication of tampering with the tamper sensor assembly 100. The security processor 150 can perform an anti-tampering operation responsive to a signal from the environmental sensor 1840 indicating that a threshold movement, a threshold change in temperature, and/or a threshold change in light has occurred within the tamper secure space 140 that is indicative of tampering.

Figure 20:
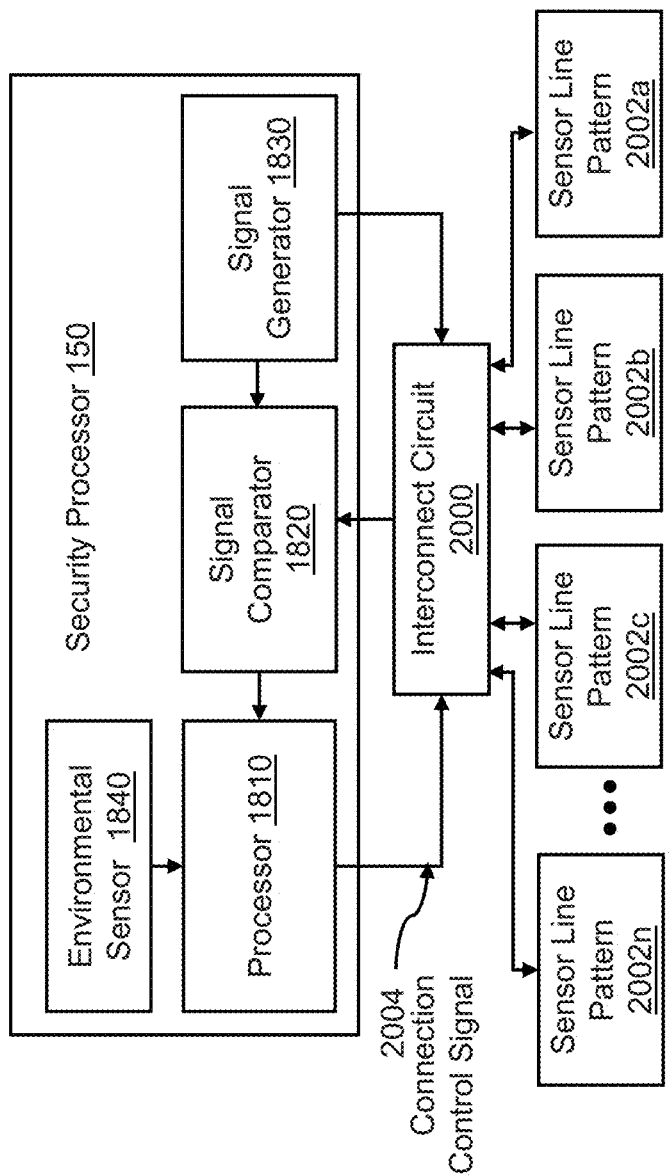
FIG. 20 illustrates how the security processor 150 of FIG. 18 can be electrically connected to monitor electrical characteristics of a plurality of sensor line patterns through an interconnect circuit, in accordance with some embodiments.

FIG. 20 illustrates how the security processor 150 of FIG. 18 can be electrically connected to monitor electrical characteristics of a plurality of sensor line patterns 2002a-n through an interconnect circuit 2000, in accordance with some embodiments. The signal generator 1830 provides signals through the interconnect circuit 2000 to the sensor line patterns 2002a-n. The sensor line patterns 2002a-n may receive the same signal or each pattern 2002a-n may receive a different signal. In some embodiments, the processor 1810 provides a connection control signal 2004 to the interconnect circuit 2000 to select which of the sensor line patterns 2002a-n receives which control signal from the signal generator 1820. The processor 1810 may control the interconnect circuit 2000 to select among a plurality of different spaced apart nodes along one or more of the sensor line patterns 2002a-n where the signal is input.

The signal comparator 1820 may be connected through the interconnect circuit 2000 to receive signals conducted through the sensor line patterns 2002a-n. The processor 1810 may control the interconnect circuit 2000 to select among a plurality of different spaced apart nodes along one or more of the sensor line patterns 2002a-n where the signal is tapped to be provided to the signal comparator 1820. More particularly, the security processor 150 can control the interconnect circuit 2000 through a connection control signal to select among a plurality of different spaced apart nodes along one or more of the conductive lines that is to be electrically connected to the security processor 150. The security processor 150 can perform the anti-tampering operation responsive to a signal received from the selected one of the nodes not satisfying a defined condition.

The processor 1810 may similarly select among a plurality of different spaced apart nodes along one or more of the sensor line patterns 2002a-n where a shunt to ground or a defined voltage is to be applied. Enabling such time varying connectability to input nodes and/or output nodes within the sensor line patterns 2002a-n further complicates any attempt to tamper with the tamper sensor assembly 100 without being detected by the security processor 150. The security processor 150 performs the anti-tampering operation responsive to a signal received from an output node of the one or more of the conductive lines not satisfying a defined condition.

The processor 1810 may apply a shunt to a node within one or more of the sensor line patterns 2002a-n to determine if the shunted pattern is still an electrically active component of the sensor circuit. The processor 1810 may detect an externally applied source bypass signal attempting to mimic a resident sensor signal across the one or more conductor lines based on the signal generator 1830 randomizing the output signal in a way known to the processor 1810. The processor 1810 may further detect an externally applied source bypass attempting to mimic a resident sensor signal across the one or more conductor traces by validating an intentional failure state to test for proper operation.

Figure 21:
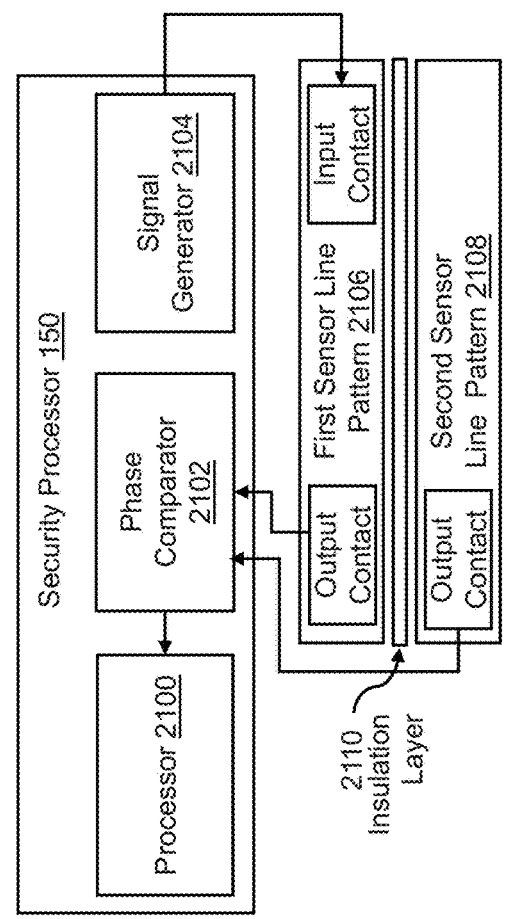
FIG. 21 illustrates a security processor that is electrically connected to monitor electrical characteristics of one or more sensor substrates in accordance with some embodiments.

FIG. 21 illustrates a security processor 150 that is electrically connected to monitor, electrical characteristics of one or more sensor substrates in accordance with some other embodiments. In the non-limiting example embodiment of FIG. 21, a sensor substrate includes a first sensor line pattern 2106 that is stacked on a second sensor line pattern 2108 with an insulation layer 2110 there between. The first and second sensor line patterns 2106 and 2108 extend across one of the lids 110 and 120. The second sensor line pattern 2108 is inductively coupled to the first sensor line pattern 2106, so that a signal conducted through the first sensor line pattern 2106 induces a corresponding signal conducted through the second sensor line pattern 2108. The security processor 150 is configured to detect tampering of the lid by sensing a threshold change in phase between signals conducted through the first and second sensor line patterns 1800 and 1802, and/or to detect tampering based on a time variation in phase of signals conducted through either one of the first and second sensor line patterns 2106 and 2108 over a defined time interval. The security processor 150 may measure impedance through the first sensor line pattern 1800 separately from measuring impedance through the second sensor line pattern 1802.

Figure 22:
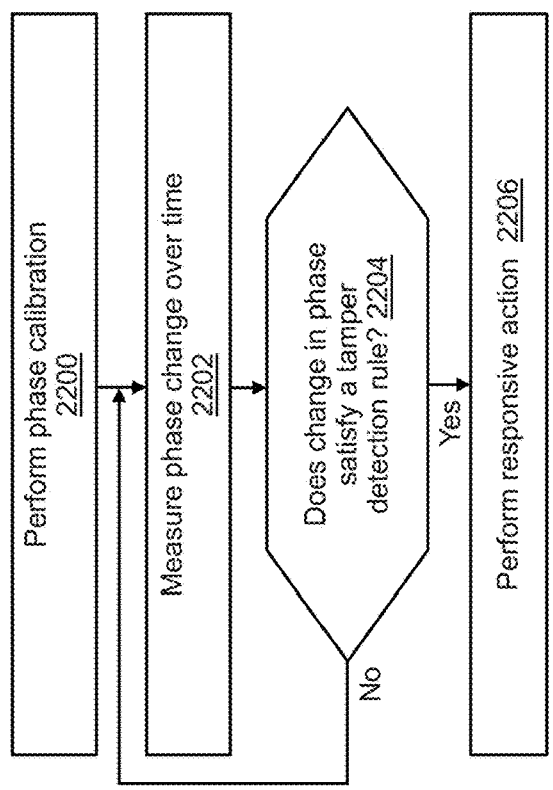
FIG. 22 is a flowchart of operations performed by the processor of FIG. 21 to detect tampering in accordance with some embodiments.

The security processor 150 can include a processor circuit 2100 (processor) which executes computer program code, a phase comparator 2102, and a signal generator circuit 1830. FIG. 22 is a flowchart of operations performed by the processor 2100 to detect tampering. The signal generator 2104 supplies an oscillating signal to an input contact of the first sensor line patterns 2106. The signal generator 2104 may include an oscillator having a frequency that is controlled responsive to characteristics, for example, resistance, inductance, and/or capacitance of the sensor line pattern 2106. In some embodiments, the signal generator 2104 outputs a pseudo-random oscillating signal to the input contact of the sensor line pattern 2106, which can prevent attempts to bypass the sensor line patterns 2106 and 2108 by providing a signal directly to the phase comparator 2102.

The processor 2100 performs an initial phase calibration (block 2200) for the sensor line patterns 2106 and 2108, which can compensate for differing line lengths, line thicknesses, and impedance characteristics created during manufacturing of the sensor line patterns 2106 and 2108. The phase comparator circuit 2102 can output a phase comparison signal which indicates phase difference between signals received from the output by the signal generator 1830 and the signals received from the sensor line patterns 2106 and 2108 and/or a change in phase (or frequency) of the signal received from either or both of the sensor line patterns 2106 and 2108. The processor 2100 measures (block 2202) phase change over a time interval using the phase comparison signal and determines (block 2204) when the phase change satisfies a tamper detection rule. A phase change can be caused by an attempt to bypass part of one of the lines and/or an attempt to inject a copycat signal into the security processor 150. When a phase change over time satisfies the tamper detection rule, the processor 2100 performs (block 2206) a responsive action that can include erasing data from memory, shutting down the cryptographic electronic components 143, damaging circuitry of the cryptographic electronic components, and/or communicating an alert notification through a wired indication interface and/or a wireless communication interface to a network node.

The processor 2100 may operate in conjunction with the signal generator 2104 to watch for known/expected signal patterns, signal frequency modulation, signal amplitude modulation, and/or signal phase modulation input to the sensor line patterns 2106 and 2108. For example, the signal generator 2104 may provide a test pattern (e.g., binary bit sequence, modulation sequence, etc.) having defined start and/or stop timings to the patterns 2106 and/or 2108. The processor 2100 may compare signals received from the patterns 2106 and/or 2108 to the test pattern and/or compare start and/or stop timings of the received signals to the defined start and/or stop timings to identify any discrepancy that is indicative of tampering. When the signal output from one or both of the sensor line patterns 2106 and 2108 does not match the expected pattern or modulated signal within one or more thresholds defined by the tamper detection rule, the processor 2100 can trigger the responsive action (block 2206).

Example Security Processor

Figure 23:
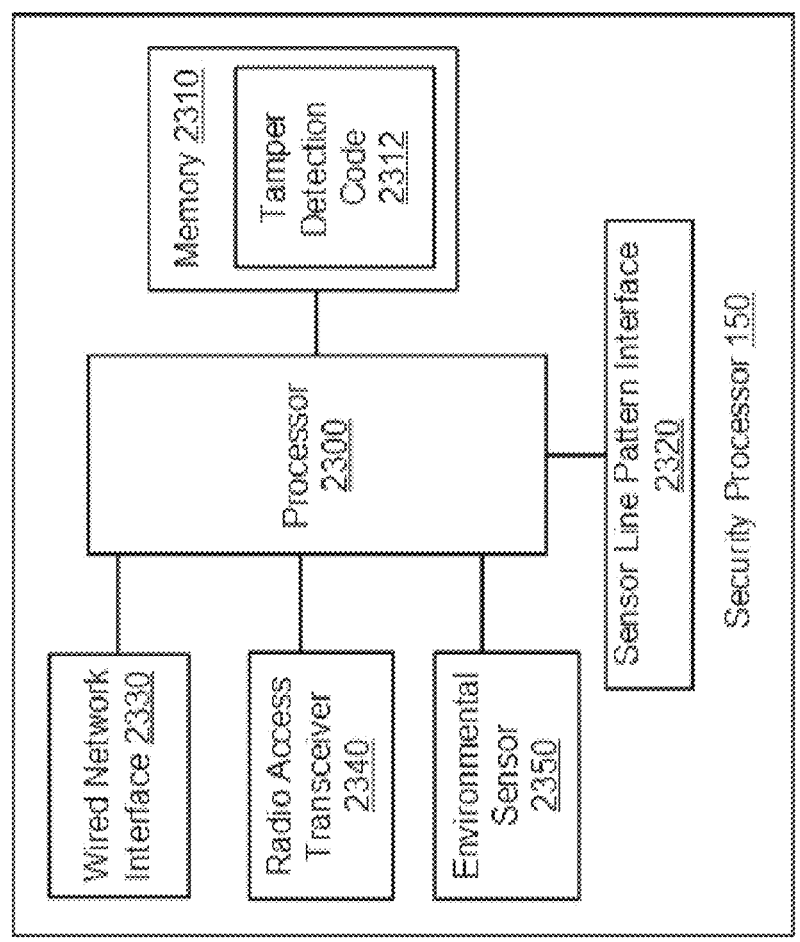
FIG. 23 is a block diagram of a security processor configured according to some embodiments of the present disclosure.

FIG. 23 is a block diagram of a security processor 150 configured according to some embodiments of the present disclosure. Referring to FIG. 23, the security processor 150 includes a processor 2300, a memory 2310, and a sensor line pattern interface 2320. The sensor line pattern interface 2320 may include a signal comparator, a phase comparator, an analog to digital converter, amplifier, signal filter, etc. used to enable the processor 2300 to receive and process signals from one or more sensor line patterns. The security processor may include an environmental sensor 2350 that senses movement, temperature, and/or light. The security processor 150 may include a radio access communication transceiver 2340 and/or a wired network communication interface 2330. The radio access communication transceiver 2340 can include, but is not limited to, a LTE or other cellular transceiver, WLAN transceiver (IEEE 802.11), WiMax transceiver, Bluetooth transceiver, NFC transceiver, or other radio communication transceiver configured to communicate directly or indirectly (e.g., via a radio access node) with a network node.

The processor 2300 may include one or more data processing circuits, such as a general purpose and/or special purpose processor, such as a microprocessor and/or digital signal processor. The processor 2300 is configured to execute computer program code in the memory 2310, described below as a non-transitory computer readable medium, to perform at least some of the operations described herein as being performed by a user terminal. The computer program code includes tamper detection code 2312 that when executed by the processor 2300 causes the processor 2300 to perform operations in accordance with one or more embodiments disclosed herein.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS) and Security as a Service (SECaas).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A tamper sensor assembly comprising:
a lid having a surface;
a sensor substrate on the surface of the lid and having conductive lines that extend across at least a major portion of the surface of the lid and conform to three dimensional characteristics of the surface of the lid, where
the conductive lines are prepared by a manufacturing process using a line pattern controller that processes data defining predetermined characteristics of the substrate through an algorithm in program code to control a defined amount of structural randomization in one or more characteristics of said conductive lines to enable more reliable formation of a pattern of the conductive lines on the substrate based on the pre-determined characteristics of the substrate, wherein
the one or more characteristics of said conductive lines comprise a width of a line segment, a thickness of said line segment and a pitch between adjacent line segments of the pattern based on said predetermined characteristics of the substrate where the line segment is formed during said manufacturing process, wherein
said data defining predetermined characteristics of the substrate characterizes one or more of a local surface roughness, corrosion, scratch, void, slope and raised projection; and
a security processor electrically connected to the conductive lines of the sensor substrate and configured to identify occurrence of tampering with the lid based on an electrical characteristic, produced as a result of the defined amount of structural randomization, of signals conducted through the conductive lines, and to perform an anti-tampering operation responsive to identifying occurrence of tampering.

2. The tamper sensor assembly of claim 1, further comprising:
a plurality of the lids that are connected together to provide an interior space therebetween for storage of an electronic component; and
a plurality of the sensor substrates each on the surface of a different one of the lids and having conductive lines that extend across at least a major portion of the surface of the lid,
wherein the security processor is electrically connected to the conductive lines of the sensor substrates and configured to monitor the electrical characteristic of the signals conducted through the conductive lines to identify the occurrence of tampering with any of the conductive lines which is indicative of a person's attempt to access any electronic component stored within the interior space.

3. The tamper sensor assembly of claim 2, wherein:
the lids have holes into which removable interconnects extend to secure the lids together to form the interior space;
at least some of the conductive lines of the lids extend at least to an edge of the holes to electrically connect to the interconnects while the interconnects secure the lids together to form the interior space; and
the security processor identifies occurrence of tampering responsive to detecting that any one of the interconnects ceases being electrically connected to at least one of the conductive lines which indicates that the one of the interconnects has been loosened from one of the holes.

4. The tamper sensor assembly of claim 3, wherein:
the holes are threaded screw holes and the interconnects are threaded screws;
the at least some of the conductive lines form a pattern extending at least partially into the threaded screw holes, a spacing between the conductive lines in the pattern causes a plurality of the conductive lines in the pattern to be electrically shorted through the threaded screw residing in the respective one of the threaded screw holes while the threaded screw secures the lids together; and
the security processor identifies from the electrical characteristic of the signals when a plurality of the conductive lines in the pattern cease being electrically shorted through one of the threaded screws which indicates that the one of the threaded screws has been loosened from one of the threaded screw holes.

5. The tamper sensor assembly of claim 2, wherein:
the anti-tampering operation performed by the security processor comprises erasing content of a memory circuit of an electronic component stored within the interior space, generating a voltage above a threshold level through a connection to an electronic component stored within the interior space that is sufficient to permanently damage operation of an electronic circuit of the electronic component, and/or communicating an alert message through a communication interface indicating the occurrence of tampering.

6. The tamper sensor assembly of claim 1, wherein:
the security processor is configured, by way of an epoxy material inserted into a tamper secure space between one portion of the lid and another portion of the lid that includes compositional, or molecular, markers that in conjunction with said sensor substrate responds in a predetermined signal range to monitor and identify occurrence of tampering with the lid responsive to detecting presence of an electromagnetic interference component having a defined characteristic in said predetermined signal range of a signal received from a group of the conductive lines to avert a side channel form of attack attempting to obtain access to cryptographic electronic components.

7. The tamper sensor assembly of claim 6, wherein:
the security processor is configured to identify occurrence of tampering with the lid responsive to detecting a threshold difference between an electromagnetic interference component having a defined characteristic in the signal received from one group of the conductive lines extending across one portion of the lid and an electromagnetic interference component having the defined characteristic in the signal received from another group of the conductive lines extending across another portion of the lid.

8. The tamper sensor assembly of claim 1, wherein:
a first group of the conductive lines of the sensor substrate is stacked on a second group of the conductive lines of the sensor substrate with a dielectric layer intervening between the first and second groups of the conductive lines to electrically isolate the conductive lines of the first group from the conductive lines of the second group;
the conductive lines of the first group are electrically connected between a first input node and a first output node;
the conductive lines of the second group are electrically connected between a second input node and a second output node; and
the security processor comprises a signal generator that provides at least one input signal to the first and second input nodes, and the security processor identifies occurrence of tampering with the lid based on an electrical characteristic of signals received through the first and second output nodes.

9. The tamper sensor assembly of claim 8, wherein:
the conductive lines of the first and second groups are laterally spaced apart and extend substantially parallel to one another; and
at least some individual ones of the conductive lines of the first group at least partially overlap underlying laterally adjacent pairs of the conductive lines of the second group.

10. The tamper sensor assembly of claim 9, wherein:
laterally adjacent ones of the conductive lines of the first group alternate between a first layer and a second layer; and
laterally adjacent ones of the conductive lines of the second group alternate between the second layer and the first layer.

11. The tamper sensor assembly of claim 8, wherein:
each of the conductive lines of the first group cross over each of the conductive lines of the second group.

12. The tamper sensor assembly of claim 8, wherein:
the security processor comprises a signal generator that provides a first input signal to the conductive lines of the first group and provides a second input signal, which has a different electrical characteristic than the first input signal, to the conductive lines of the second group, and the security processor performs the anti-tampering operation responsive to identifying that the second input signal is present as a component of a signal received through the first output node or responsive to identifying that the first input signal is present as a component of a signal received through the second output node.

13. The tamper sensor assembly of claim 1, wherein:
the conductive lines of the sensor substrate are spaced apart laterally across a portion of the surface of the lid, individual ones of one group of the conductive lines have an end extension that wraps around to electrically connect to individual ones of another group of the conductive lines.

14. The tamper sensor assembly of claim 1, wherein:
the security processor comprises a signal generator that provides a pseudo-random oscillating signal to an input node of a group of the conductive lines, and the security processor performs the anti-tampering operation responsive to identifying a threshold difference between the pseudo-random oscillating signal provided to the input node and a signal received through an output node of the group of the conductive lines, where the signal generator includes an oscillator having a frequency that is controlled responsive to a resistance, a capacitance or an inductance of said width, said thickness, and said pattern of the one or more said conductive lines to produce said pseudo-random oscillating signal, and
a phase comparator for measuring phase changes in the pseudo-random oscillating signal to detect a tampering of the one or more said conductive lines.

15. The tamper sensor assembly of claim 1, wherein:
the security processor measures impedance of a group of the conductive lines, controls frequency of an oscillating signal provided by a signal generator to an input node of the group of the conductive lines based on the impedance measurement, and performs the anti-tampering operation responsive to identifying a threshold difference between the signal provided to the input node and a signal received through an output node of the group of the conductive lines.

16. The tamper sensor assembly of claim 1, further comprising:
a plurality of the lids that are connected together to provide an interior space therebetween for storage of an electronic component;
the sensor substrate is on the surface of at least one of the lids; and
an environmental sensor mounted to one of the lids within the interior space and is configured to detect movement, temperature, and/or light;
wherein the security processor further performs the anti-tampering operation responsive to a signal from the environmental sensor indicating that a threshold movement, a threshold change in temperature, and/or a threshold change in light has occurred that is indicative of tampering.

17. The tamper sensor assembly of claim 1,
further comprising an interconnect circuit controlled by the security processor through a connection control signal to select among a plurality of different spaced apart nodes along one or more of the conductive lines that is to be electrically connected to ground or to a signal provided by a signal generator,
wherein the security processor performs the anti-tampering operation responsive to a signal received from an output node of the one or more of the conductive lines not satisfying a defined condition.

18. The tamper sensor assembly of claim 1,
further comprising an interconnect circuit controlled by the security processor through a connection control signal to select among a plurality of different spaced apart nodes along one or more of the conductive lines that is to be electrically connected to the security processor,
wherein the security processor performs the anti-tampering operation responsive to a signal received from the selected one of the nodes not satisfying a defined condition.

19. The tamper sensor assembly of claim 1, further comprising:
a signal generator that outputs a plurality of signals having a different electrical characteristic relative to each other; and
an interconnect circuit controlled by the security processor through a connection control signal to select among the plurality of signals output by the signal generator to be provided to a one or more of the conductive lines,
wherein the security processor performs the anti-tampering operation responsive to a signal received from an output node of the one or more of the conductive lines not satisfying a defined condition.

20. The tamper sensor assembly of claim 1, wherein:
a first group of the conductive lines of the sensor substrate is stacked on a second group of the conductive lines of the sensor substrate with a dielectric layer intervening between the first and second groups of the conductive lines to electrically isolate the conductive lines of the first group from the conductive lines of the second group, wherein the first group of the conductive lines is inductively coupled to the second group of the conductive lines through the dielectric layer;
the security processor comprises a signal generator that provides an oscillating signal to an input node of one of the first and second groups of the conductive lines; and
the security processor monitors electrical characteristic of a signal received from the other one of the first and second groups of the conductive lines caused by the inductive coupling to the oscillating signal conducted through the one of the first and second groups of the conductive lines.

21. The tamper sensor assembly of claim 20, wherein:
the security processor performs the anti-tampering operation responsive to identifying a threshold change in phase between signals conducted through the first and second groups of the conductive lines,
where the processor performs an initial phase calibration for the pattern of said first and second groups of the conductive lines, which compensates for differing line lengths, line thicknesses, and impedance characteristics created during manufacturing of the pattern.

22. The tamper sensor assembly of claim 21, further comprising:
a signal generator that provides a test binary bit sequence to an input node of a group of the conductive lines,
wherein the security processor performs the anti-tampering operation responsive to detecting a threshold difference between a binary bit sequence received from an output node of the group of the conductive lines and the test binary bit sequence provided to the input node of the group of the conductive lines.

23. The tamper sensor assembly of claim 22, further comprising:
a signal generator that outputs the test binary bit sequence with a defined start and/or stop timing,
wherein the security processor performs the anti-tampering operation responsive to detecting a threshold difference between a start and/stop timing of the binary bit sequence received from the output node and the defined start and/or stop timings or responsive to detecting a threshold difference between a binary bit sequence received from an output node of the group of the conductive lines and the test binary bit sequence provided to the input node of the group of the conductive lines.

24. The tamper sensor assembly of claim 20, wherein:
the security processor performs the anti-tampering operation responsive to identifying a threshold change in phase in the signal conducted through the first and/or second groups of the conductive lines over a defined time interval.

25. The tamper sensor assembly of claim 20, wherein:
signal generator provides a pseudo-random oscillating signal to the input node of the one of the first and second groups of the conductive lines; and
the security processor performs the anti-tampering operation responsive to detecting a threshold difference between a signal received from the other one of the first and second groups of the conductive lines and the pseudo-random oscillating signal provided to the input node of the one of the first and second groups of the conductive lines.

26. The tamper sensor assembly of claim 1, where the line pattern controller includes an inkjet print head that by way of non-contact vector printing controls injection of conductive material droplets through the print head to form pixels arranged to provide sensor line patterns on the substrate having line widths as small as 60-100 μm.

27. The tamper sensor assembly of claim 1, where the line pattern controller includes an injection nozzle that by way of non-contact vector printing controls the flow of a conductive material blown through the injection nozzle by a sheath gas to provide high density micro droplets in a continuous stream that is tightly focused to form sensor lines on the substrate.

28. The tamper sensor assembly of claim 1, where the line pattern controller includes an aerosol jet nozzle that by way of three-dimensional (3D) printing controls a shape and height of the sensor substrate having as small as 10 μm line widths and 1 μm line thicknesses.

29. A lid for production of a tamper sensor assembly prepared by a manufacturing process comprising the steps of:
characterizing and locating anomaly features of the lid during a machining step and a preparing step, wherein the characterization of the anomaly features comprises characterizing any one or more of local surface roughness, corrosion, scratch, void, and raised projection along a 3D surface (x,y,z) of the lid;
printing one or more conductor traces along a 3D surface (x,y,z) of the lid to form a sensor circuit for detection of a tampering; and
controlling a width, thickness, and pitch between segments of the one or more conductive traces responsive to the identified characteristics and locations of the anomaly features during said printing step by operation of a line pattern controller,
wherein the controlling further controls the printing to provide a structural randomization of the one or more conductive traces across the 3D surface (x,y,z) of the lid.

* * * * *